(12) United States Patent
Myers et al.

(10) Patent No.: US 10,941,543 B2
(45) Date of Patent: Mar. 9, 2021

(54) METHOD TO SELECT AN ACTIVE STEERING INPUT DEVICE BASED ON ORBITAL PRESSURE

(71) Applicant: DEERE & COMPANY, Moline, IL (US)

(72) Inventors: David J. Myers, Asbury, IA (US); Brian K. Kellogg, Bellevue, IA (US); Aaron R. Kenkel, East Dubuque, IL (US); Adam J. Sobkowiak, Dubuque, IA (US); Michael McCabe, Peosta, IA (US); Bryan J. Huttenlocher, Galena, IL (US); Jason L. Mueller, Platteville, WI (US)

(73) Assignee: DEERE & COMPANY, Moline, IL (US)

( * ) Notice: Subject to any disclaimer, the term of this patent is extended or adjusted under 35 U.S.C. 154(b) by 309 days.

(21) Appl. No.: 15/895,387

(22) Filed: Feb. 13, 2018

(65) Prior Publication Data

US 2019/0249395 A1 Aug. 15, 2019

(51) Int. Cl.
*E02F 9/22* (2006.01)
*B60N 2/75* (2018.01)
*B62D 1/10* (2006.01)
*B62D 1/22* (2006.01)
*B62D 33/06* (2006.01)
(Continued)

(52) U.S. Cl.
CPC .............. *E02F 9/225* (2013.01); *B60N 2/797* (2018.02); *B62D 1/10* (2013.01); *B62D 1/22* (2013.01); *B62D 33/06* (2013.01); *E02F 9/16* (2013.01); *E02F 9/2004* (2013.01); *E02F 9/22* (2013.01); *E02F 9/2267* (2013.01); *F15B 11/22* (2013.01);
(Continued)

(58) Field of Classification Search
CPC ....... E02F 9/225; E02F 9/2004; E02F 9/2267; E02F 9/16; E02F 9/22; E02F 3/283; E02F 9/2087; E02F 9/0841; F15B 13/022; F15B 11/22; F15B 19/005; B62D 33/06; B62D 1/22; B62D 1/10; B62D 5/09; B60N 2/797
See application file for complete search history.

(56) References Cited

U.S. PATENT DOCUMENTS 6,135,230 A * 10/2000 Schenck ................ B60K 28/04
180/269
6,408,977 B1 6/2002 Obertrifter et al.
(Continued)

OTHER PUBLICATIONS

Sauder Danfoss; Electro-Hydraulic Power Steering; Brochure; 4 pages.

*Primary Examiner* — Mary Cheung
(74) *Attorney, Agent, or Firm* — Taft Stettinius & Hollister LLP; Stephen F. Rost (57) ABSTRACT

A work machine having a cab coupled to a frame, a steering system coupled to the frame, a controller configured to selectively articulate the steering system, a joystick assembly positioned in the cab and in communication with the controller, a steering wheel assembly positioned in the cab and configured to selectively articulate the steering system, and a steering wheel sensor coupled to the steering wheel assembly and in communication with the controller to identify movement of the steering wheel assembly. Wherein, the controller does not articulate the steering system responsive to movement of the joystick assembly when the steering wheel sensor identifies movement of the steering wheel.

7 Claims, 9 Drawing Sheets

(51) Int. Cl.
*F15B 19/00* (2006.01)
*E02F 9/16* (2006.01)
*F15B 11/22* (2006.01)
*F15B 13/02* (2006.01)
*E02F 9/20* (2006.01)
*E02F 3/28* (2006.01)

(52) U.S. Cl.
CPC ......... *F15B 13/022* (2013.01); *F15B 19/005* (2013.01); *E02F 3/283* (2013.01)

(56) References Cited

U.S. PATENT DOCUMENTS

| | | | |
|---|---|---|---|
| 9,050,999 B2* | 6/2015 | Kuipers | B62D 6/008 |
| 9,116,787 B1* | 8/2015 | Johnson | B60T 7/16 |
| 2003/0127258 A1* | 7/2003 | Lansberry | B62D 49/0635 |
| | | | 180/9.36 |
| 2004/0261300 A1* | 12/2004 | McClelland | E02F 9/2004 |
| | | | 37/348 |
| 2006/0137931 A1* | 6/2006 | Berg | B62D 1/22 |
| | | | 180/333 |
| 2007/0209356 A1 | 9/2007 | Graeve et al. | |
| 2008/0116000 A1* | 5/2008 | Huang | B62D 12/00 |
| | | | 180/418 |
| 2009/0038186 A1* | 2/2009 | Osswald | E02F 3/96 |
| | | | 37/413 |
| 2015/0068012 A1* | 3/2015 | McClister | B62D 65/00 |
| | | | 29/428 |
| 2018/0050724 A1* | 2/2018 | Morselli | B62D 6/007 |
| 2019/0331761 A1* | 10/2019 | Wynn | G01S 1/70 |

* cited by examiner

METHOD TO SELECT AN ACTIVE STEERING INPUT DEVICE BASED ON ORBITAL PRESSURE

FIELD OF THE DISCLOSURE

The present disclosure relates to a steering priority system, and more particularly to a steering priority system in a work machine with both a steering wheel and joystick steering control.

BACKGROUND OF THE DISCLOSURE

Work machines frequently have steering systems that implement a hydraulic and electro-hydraulic (hereinafter "EH") system. The steering systems can have multiple inputs that allow the user to control the steering system by selecting the preferred input. In one example, the work machine may have both a steering wheel and one or more joystick that control the steering system. Often, one or more hydraulic cylinder selectively reposition wheels or frame components of the work machine to implement a steering command received from the steering system.

SUMMARY

One embodiment is a work machine with a cab coupled to a frame, a steering system coupled to the frame, a controller configured to selectively articulate the steering system, a joystick assembly positioned in the cab and in communication with the controller, a steering wheel assembly positioned in the cab and configured to selectively articulate the steering system, and a steering wheel sensor coupled to the steering wheel assembly and in communication with the controller to identify movement of the steering wheel assembly. Wherein, the controller does not articulate the steering system responsive to movement of the joystick assembly when the steering wheel sensor identifies movement of the steering wheel.

In one example of this embodiment, the steering wheel assembly is a hydro-mechanical steering wheel assembly that includes a steering valve having at least one input and at least one output, wherein the steering wheel sensor is a hydraulic pressure sensor positioned to identify when the output of the steering valve is above a threshold.

In another example, the steering wheel assembly is fluidly coupled to a steering logic valve assembly that selectively fluidly couples the steering wheel sensor to a pump line.

Another example includes an armrest positioned in the cab and having a first position and a second position and an armrest position switch coupled to the armrest and communicating to the controller whether the armrest is in the first position or the second position.

Wherein, the joystick assembly controls the steering system when the controller determines that the armrest is in the second position, and the steering wheel sensor is not identifying movement of the steering wheel assembly. In one aspect of this example, the steering wheel assembly is a hydro-mechanical steering wheel assembly that includes a steering valve having at least one input and at least one output. Further wherein, the steering wheel sensor is a hydraulic pressure sensor positioned to identify when the output of the steering valve is above an output threshold. Further wherein, the controller communicates with the steering wheel sensor and identifies movement of the steering wheel assembly when the hydraulic pressure sensor indicates a hydraulic pressure above a hydraulic pressure threshold.

In another example, the steering wheel assembly has an orbital valve that has an active position and an inactive position, wherein the active position selectively fluidly couples the steering system to a tank and a pump. One aspect of this example includes a logic valve fluidly coupled to the orbital valve and a pressure sensor fluidly coupled to the logic valve through a sensor line. Wherein the logic valve selectively couples the sensor line to the pump when the orbital valve is in the active position.

Another embodiment is a method for prioritizing multiple steering inputs that includes providing a steering wheel assembly having an orbital valve with a first pressure sensor positioned to identify an output of the orbital valve, an electro-hydraulic assembly having a joystick, a controller, and a steering system selectively controlled by the steering wheel assembly or the joystick, storing, in the controller, a pressure threshold value, monitoring, with the first pressure sensor communicating to the controller, a first pressure value, comparing, with the controller, the first pressure value to the pressure threshold value, and disabling, with the controller, control of the steering system with the joystick when the first pressure value is greater than the pressure threshold value.

One example of this embodiment includes controlling the steering system with the joystick through the electro-hydraulic assembly when the first pressure value is less than the pressure threshold value. One aspect of this example includes controlling the steering system with the joystick through the electro-hydraulic assembly when the controller identifies the joystick has been manipulated.

Yet another example includes providing a logic valve that is fluidly coupled to the output of the orbital valve and repositioning the logic valve based on an output pressure of the orbital valve. In one aspect of this example, the logic valve has a first position and a second position, wherein when the logic valve is in a first position the first pressure sensor is not fluidly coupled to a pump and when the logic valve is in a second position the first pressure sensor is fluidly coupled to the pump.

In another example, the steering system has at least one hydraulic cylinder, wherein the output of the orbital valve is fluidly coupled to the hydraulic cylinder.

Another example includes providing a second pressure sensor fluidly positioned to identify the output of the orbital valve, monitoring, with the second pressure sensor communicating to the controller, a second pressure value of the output of the orbital valve, disabling, with the controller, control of the steering system with the joystick when either of the first pressure value or the second pressure value is greater than the pressure threshold value.

Yet another embodiment is a work machine steering system with a frame having a front portion and a rear portion that pivot relative to one another, a cylinder assembly coupled to the frame and configured to pivot the front portion relative to the rear portion, an orbital valve assembly fluidly coupled to the cylinder assembly, a first hydraulic pressure sensor, an electro-hydraulic assembly having a joystick, the electro-hydraulic assembly being selectively fluidly coupled to the cylinder assembly, and a controller in communication with the first hydraulic pressure sensor and the joystick. Wherein, when the controller identifies a hydraulic pressure with the first hydraulic pressure sensor that is greater than a pressure threshold value, the controller does not manipulate the cylinder assembly responsive to an input from the joystick.

One example of this embodiment includes a logic valve fluidly coupled to the orbital valve with a load line, wherein the logic valve is repositionable based on a fluid pressure of the load line. In one aspect of this example the cylinder assembly comprises a hydraulic cylinder wherein an output pressure of the orbital valve assembly is a fluid pressure applied to the hydraulic cylinder and wherein the output pressure is applied to the load line.

One example of this embodiment includes a second hydraulic pressure sensor, wherein if either the first hydraulic pressure sensor or the second hydraulic pressure sensor identify a pressure greater than the pressure threshold value, the controller does not manipulate the cylinder assembly responsive to an input from the joystick.

In another example the controller manipulates the cylinder assembly responsive to an input from the joystick when the hydraulic pressure identified by the first hydraulic pressure sensor is less than the pressure threshold value. In one aspect of this example, the controller manipulates the cylinder assembly responsive to an input from the joystick when the joystick has been activated. Wherein, the joystick is activated when an armrest is moved from a first position to a second position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
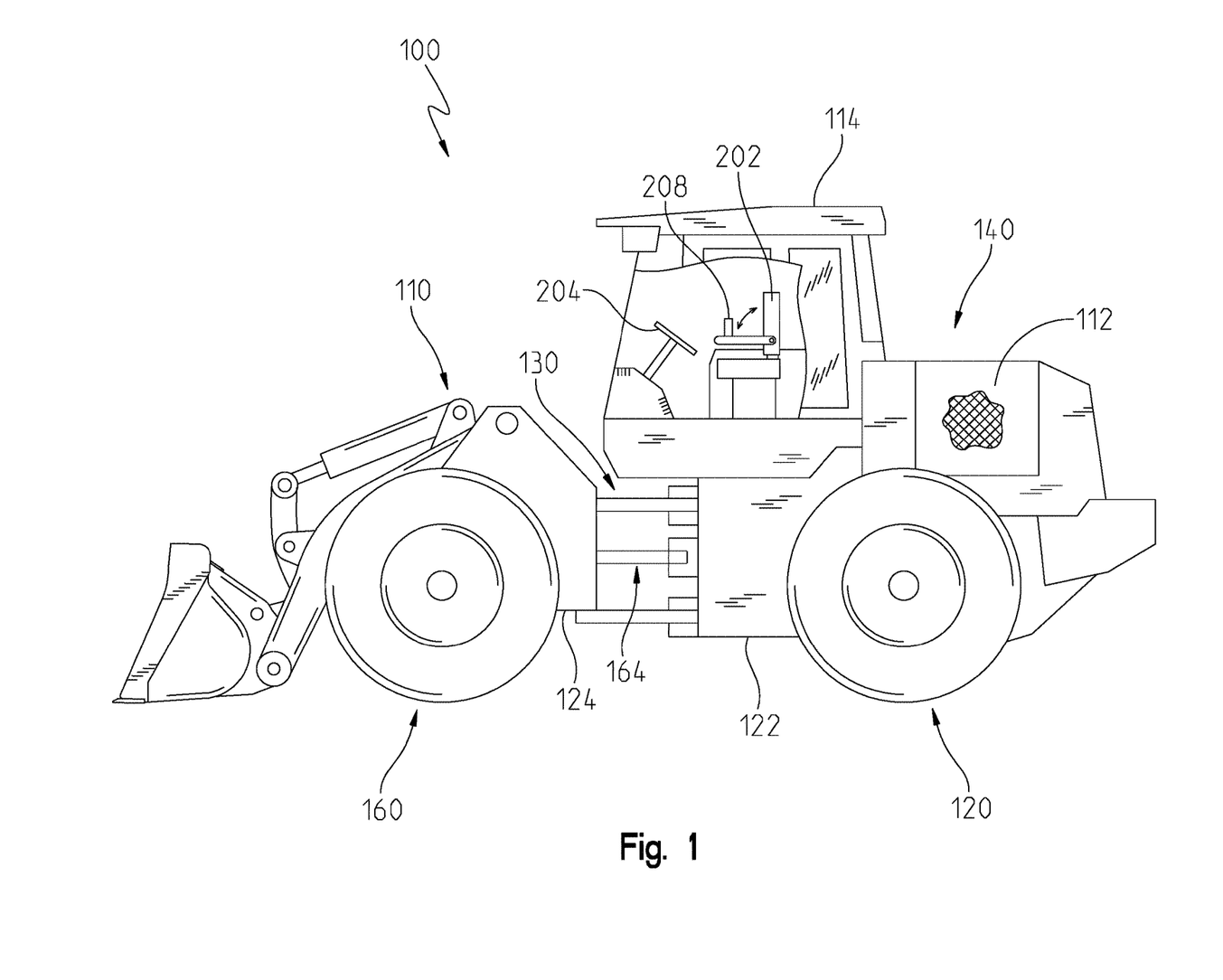
FIG. 1 is an exemplary work machine.

FIG. 1 illustrates an exemplary work machine 100 or vehicle including a front section 110 and a rear section 140. The rear section 140 includes a vehicle engine or motor 112 or other prime mover, an operator cab 114 and a rear axle and wheels 120 coupled to a rear frame 122. The front section 110 includes a front axle and wheels 160 coupled to a front frame 124. The motor 112, front axle and wheels 160, and rear axle and wheels 120 may be a part of a drive system that provides movement to the work machine 100. The drive system may control the available speed and direction of the work machine 100 as is known in the art.

The front frame 124 of the front section 110 is coupled to the rear frame 122 of the rear section 140 by articulation joint 130. The articulation joint 130 enables the front section 110 and the rear carrying section 140 to pivot relative to one another about a vertical axis for steering the work machine 100.

In one aspect of this disclosure, one or more hydraulic cylinder assembly 164 may be coupled to the rear section 140 on one end and to the front section 110 at the other. The hydraulic cylinder assembly 164 may be coupled to a hydraulic system and capable of providing a plurality if linear displacements. More specifically, the hydraulic cylinder assembly 164 may have a cylinder and a rod that is partially positioned within the cylinder. The rod may be coupled to a piston within the cylinder that is repositionable therein. As the piston slides within the cylinder, the rod may similarly be repositioned relative to the cylinder. Accordingly, the rod may be coupled to the rear section 140 and the cylinder may be coupled to the front section 110 or vice versa to provide a steering input to the user. More specifically, if the user desires to turn in a first direction, the rod may be orientated in an elongated position relative to the cylinder to pivot the rear section 140 in a first direction about the vertical axis. Alternatively, if the user desires to turn in a second direction, the rod may be oriented in a shortened position relative to the cylinder to pivot the rear section 140 in a second direction relative to the front section 110 about the vertical axis. The second direction may be substantially opposite the first direction.

While a single hydraulic cylinder is described above, a person skilled in the relevant art understands that more than one hydraulic cylinder may be utilized to pivot the sections 140, 110 relative to one another. More specifically, a hydraulic cylinder may be located on either side of the vertical axis to pivot the front section 110 relative to the rear section 140. In this configuration, as one hydraulic assembly is becoming elongated the other hydraulic assembly may be shortened. Accordingly, no particular number of hydraulic assemblies is limiting, and this disclosure considers any number of hydraulic cylinders utilized for steering.

While a particular work machine 100 is shown herein to illustrate a steering system, this disclosure is considered for other types of work machines as well. More specifically, this disclosure applies at least to any type of work machine that utilizes a hydraulic steering system and that has both a joystick and a steering wheel. Accordingly, this disclosure considers applications other than work machine 100 illustrated herein.

Figure 2:
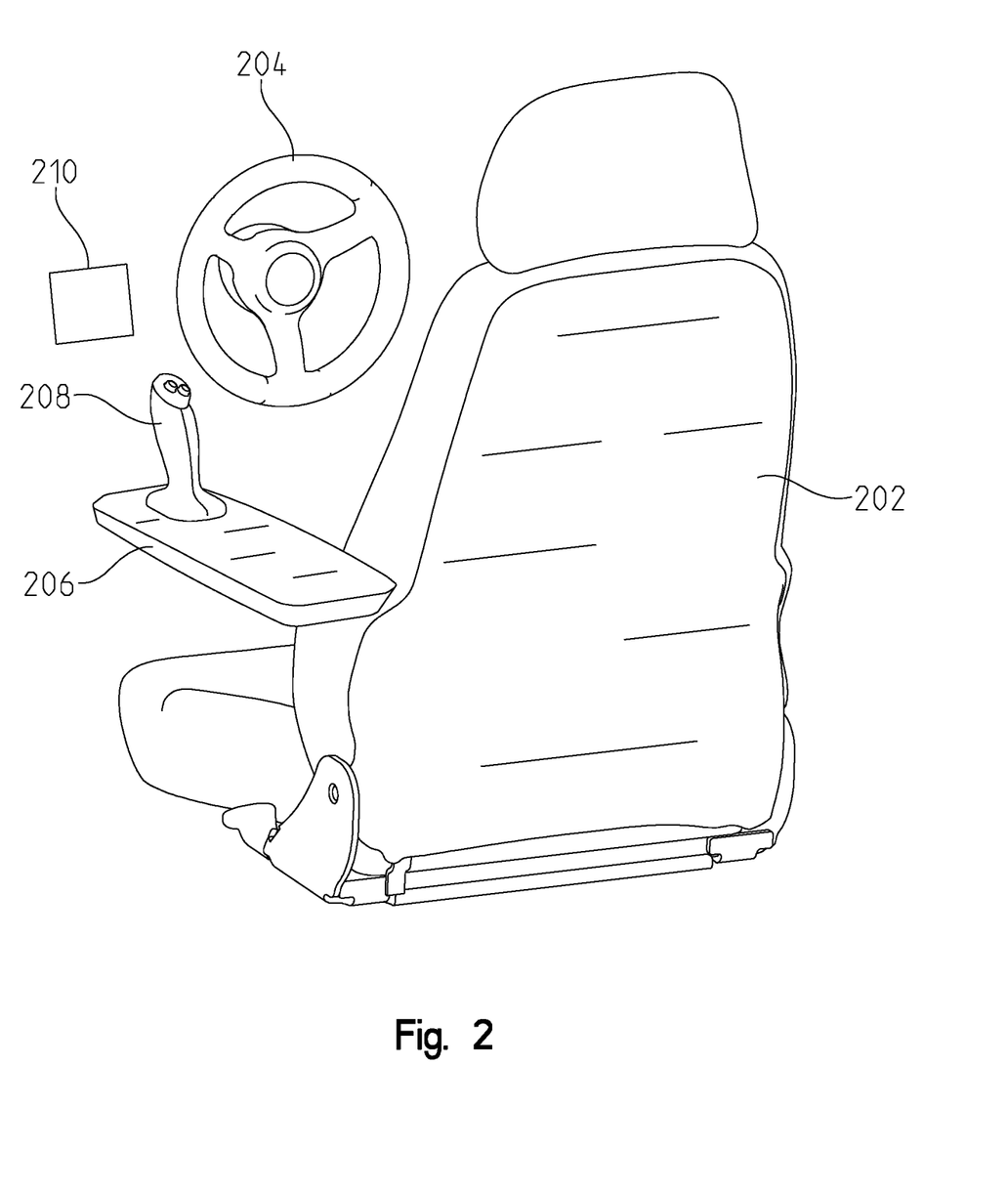
FIG. 2 is a view of an isolated portion of the interior of the work machine from FIG. 1.

Referring now to FIG. 2, a partial inside view of the operator cab 114 is shown. The operator cab 114 may have a seat 202 for the operator or user. A steering wheel 204 may also positioned in the operator cab 114 across from the seat 202. Further, an armrest 206 may be positioned next to, or coupled directly to, the seat 202. The armrest 206 may be repositionable between a lowered position (as shown in FIG. 2) and a raised position. Further, the armrest 206 may have a joystick 208 coupled thereto. In one non-exclusive example, the armrest may have a sensor positioned therein that identifies to a controller when the armrest is in the lowered position or the raised position. Further, the operator cab may have one or more user interface 210 positioned therein. The user interface 210 may be buttons, a touch-screen, or any other form of communication where the user can receive notifications on the status of the systems of the work machine 100 and provide instructions to the systems of the work machine 100.

Figure 3:
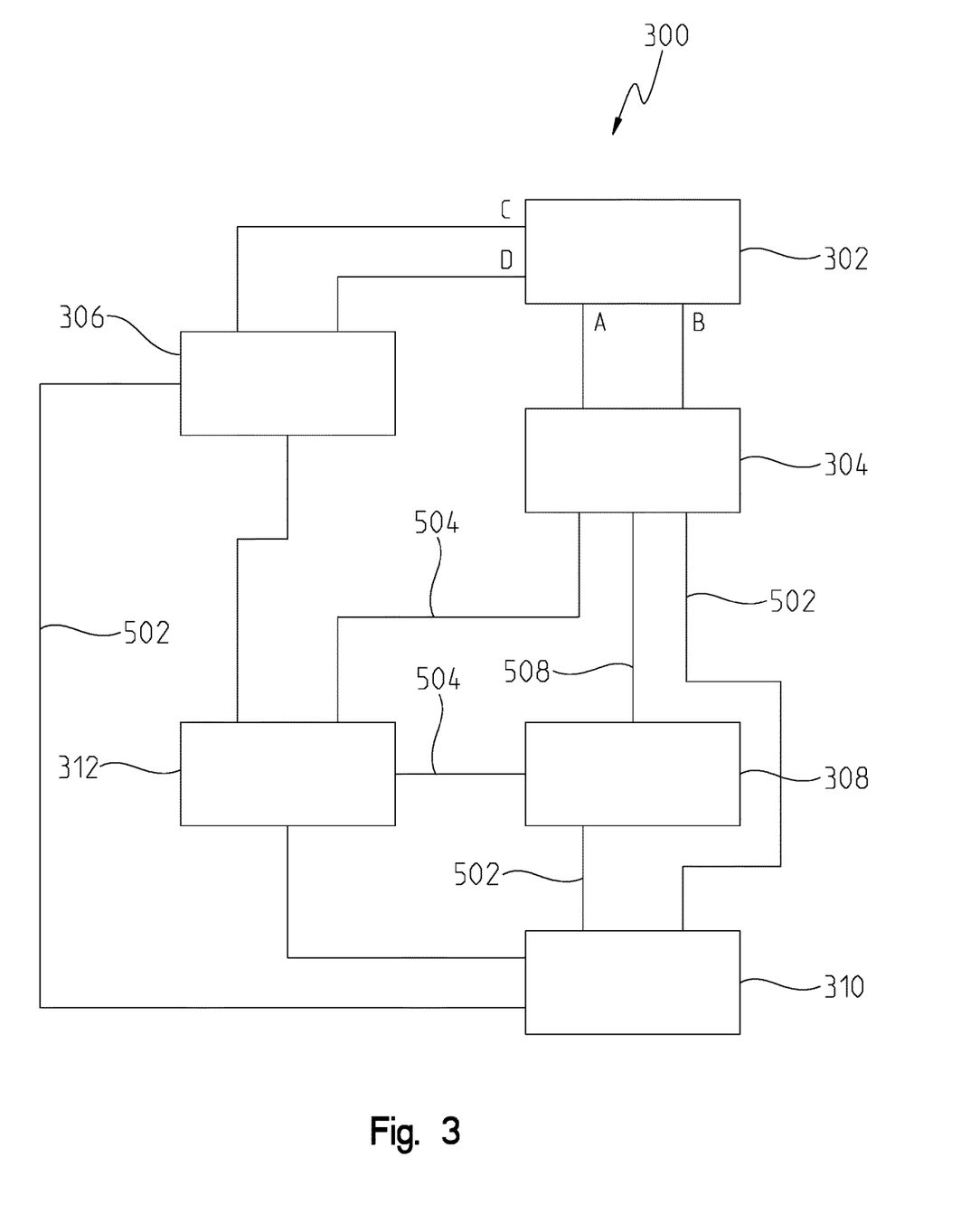
FIG. 3 is a partial hydraulic schematic of one embodiment of the present disclosure.

Referring now to FIG. 3, one embodiment of a hydraulic schematic 300 of the present disclosure is illustrated. In the hydraulic schematic 300, a cylinder assembly 302 is illustrated being selectively fluidly coupled to an orbitrol or orbital valve assembly 304 and an EH assembly 306. Further, one aspect of this disclosure may have a steering logic valve assembly 308 fluidly coupled to the orbital valve assembly 304. The hydraulic schematic 300 may have a pump assembly 310 fluidly coupled to the orbital valve assembly 304, the EH assembly 306, and the steering logic valve assembly 308 to selectively provide hydraulic fluid to the corresponding assemblies 304, 306, 308 at a flow and pressure sufficient to power the hydraulic systems. Further, a hydraulic reservoir or tank 312 may be fluidly coupled to each of the assemblies 304, 306, 308, to selectively provide a relief route for hydraulic fluid in the corresponding assemblies 304, 306, 308. The particular flow rate and pressure provided by the pump assembly 310 may vary depending on the application, and this disclosure considers utilizing a pump, orbital valve assembly, EH assembly, and steering logic valve assemblies that are designed to accommodate any hydraulic flow and pressure used in a work machine.

The cylinder assembly 302 may represent the hydraulic cylinder assembly 164 of FIG. 1 and be utilized to manipulate a steering system of the work machine 100. More specifically referring to FIG. 4, the cylinder assembly 302 may have first cylinder 402 and a second cylinder 404. The first cylinder 402 may have a first base port 406 and a first rod port 408 with a first piston 414 positioned within the first cylinder 402 therebetween. Similarly, the second cylinder 404 may have a second base port 410 and a second rod port 412 with a second piston 416 positioned therebetween.

Figure 4:
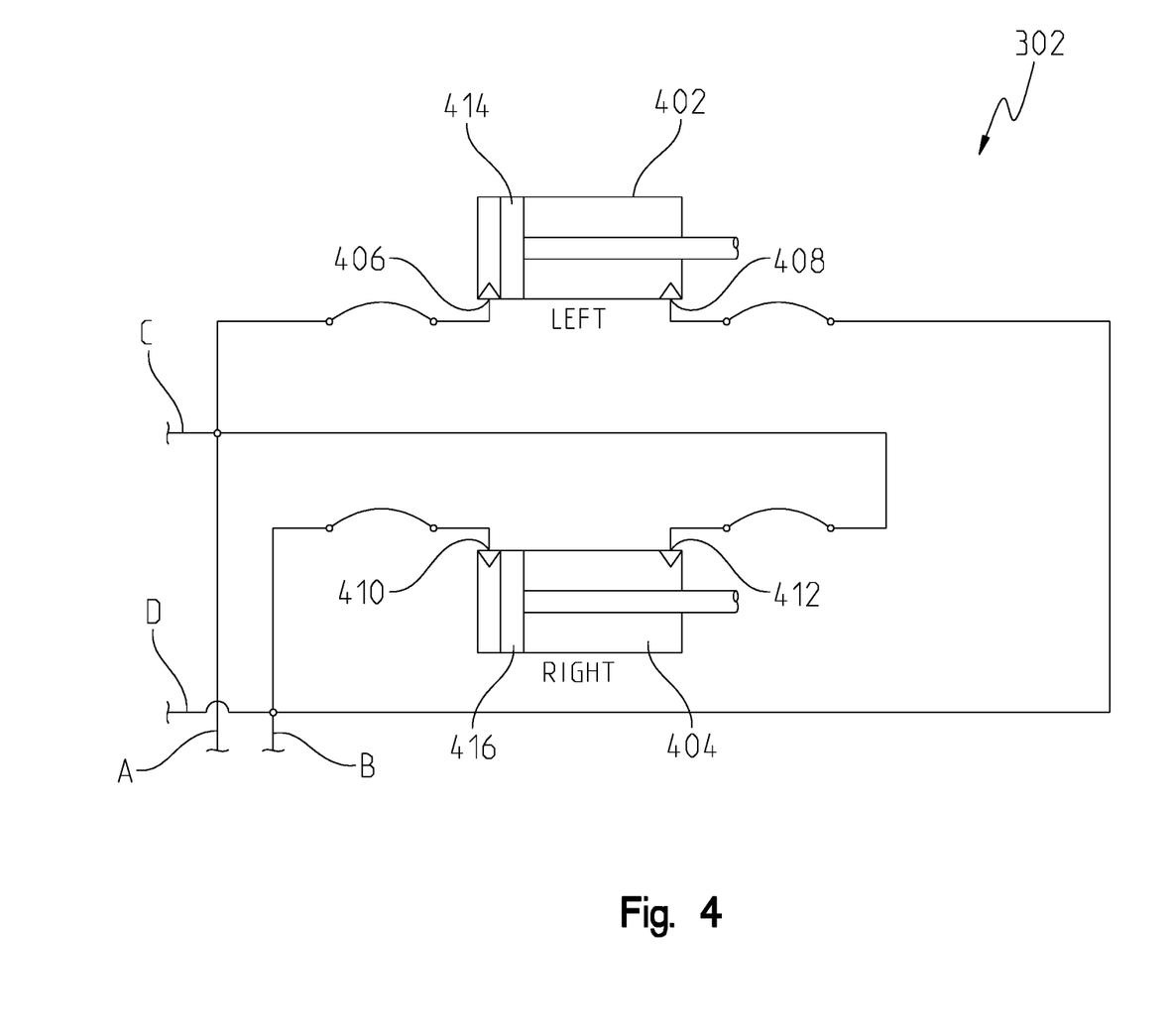
FIG. 4 is a partial schematic view of a cylinder assembly from FIG. 3.

In one aspect of this embodiment, the first and second cylinders 402, 404 may be fluidly coupled to one another so that when one of the cylinders 402, 404 is extending, the other of the cylinder 402, 404 is retracting. More specifically, the first base port 406 may be fluidly coupled to the second rod port 412. Similarly, the first rod port 408 may be fluidly coupled to the second base port 410.

The cylinders 402, 404 may selectively receive pressurized hydraulic fluid from either orbital assembly 304 through lines A and B or from the EH assembly 306 through lines C and D. Further, line A may be fluidly coupled with line C and line B may be fluidly coupled with line D. In other words, both the orbital assembly 304 and the EH assembly 306 are fluidly coupled to the cylinders 402, 404.

The orbital assembly 304 may selectively couple line A to the pump assembly 310 and line B to the tank 312 in a first configuration, or line A to the tank 312 and line B to the pump assembly 310 in a second configuration. In the first configuration, line A may provide pressurized fluid from the pump assembly 310 to the first base port 406 and the second rod port 412 while line B fluidly couples the second base port 410 and the first rod port 408 to the tank 312. In the first configuration, the first cylinder 402 may become elongated as the pressurized fluid enters the first base port 406 and forces the first piston 414 towards the first rod port 408 while the second cylinder 404 is shortened as pressurized fluid enters the second rod port 412 and forces the second piston 416 toward the second base port 410.

Alternatively, in the second configuration, line B may provide pressurized fluid from the pump assembly 310 to the second base port 410 and the first rod port 408 while line A fluidly couples the first base port 406 and the second rod port 412 to the tank 312. In the second configuration, the first cylinder 402 may become oriented in a shortened configuration as the pressurized fluid enters the first rod port 408 and forces the first piston 414 towards the first base port 406 while the second cylinder 404 may become oriented in an elongated configuration as pressurized fluid enters the second base port 410 and forces the second piston 416 toward the second rod port 412. The EH assembly 306 may similarly selectively fluidly couple the lines C and D to either the pump assembly 310 or the tank 312 in the first or second configuration utilizing the EH assembly 306.

Figure 5:
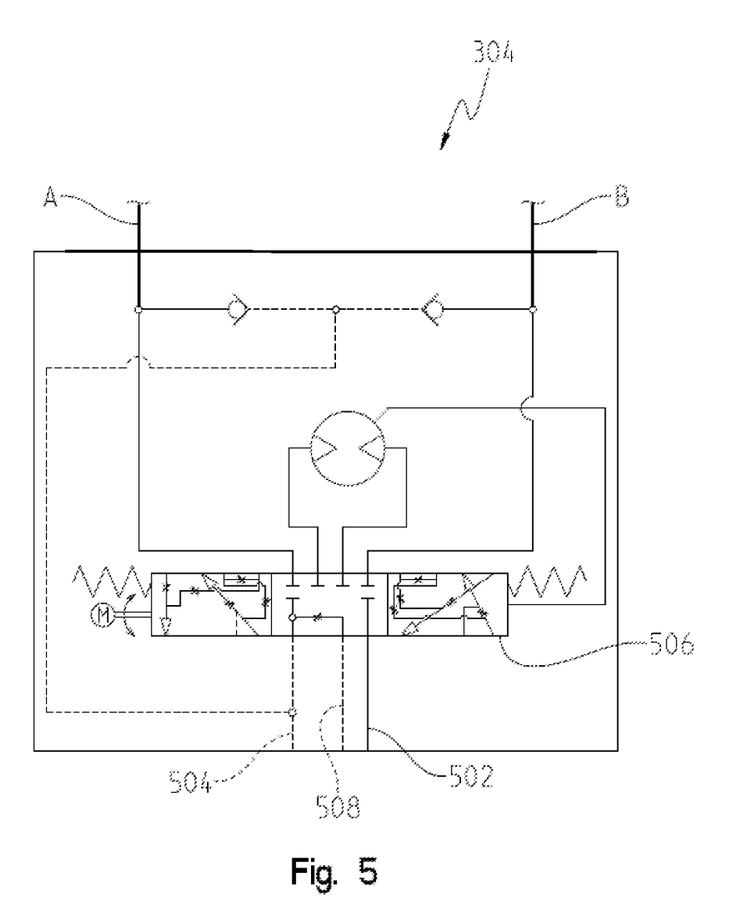
FIG. 5 is a partial schematic view of an orbital assembly from FIG. 3.

Referring now to FIG. 5, the orbital assembly 304 is shown in more detail. The orbital assembly 304 may be a hydro-mechanical system that may be fluidly coupled to lines A and B and selectively couple lines A and B to the pump assembly 310 or the tank 312. More specifically, the orbital assembly 304 may have a pump line 502 and a tank line 504 fluidly coupled to an orbital valve 506. Further, the orbital valve 506 may be fluidly coupled to a load line 508.

The orbital valve 506 may be a three position valve with the position of the orbital valve 506 determined based on a mechanical rotary input such as that from the steering wheel 204. In a first position (shown in FIG. 5), the load line 508 may be fluidly coupled to the tank line 504. Further, the pump line 502, line A, and line B, may each be substantially blocked at the orbital valve 506 when the orbital valve 506 is in the first position.

The orbital valve 506 may also become oriented in a second position. In one non-limiting example, the orbital valve 506 may become oriented in the second position when the steering wheel 204 is rotated in a clockwise direction. In the second position, the pump line 502 may be fluidly coupled with line B and thereby provide pressurized hydraulic fluid to the cylinders 402, 404 via line B. Also, while the orbital valve 506 is in the second position, the tank line 504 may be fluidly coupled to line A thereby allowing hydraulic fluid in line A of the cylinders 402, 404 to exhaust to the tank 312. Accordingly, when the orbital valve 506 is in the second position, the cylinders 402, 404 may be in the second configuration described above wherein the first cylinder 402 may become shortened as the second cylinder 404 is elongated. Also, while in the second position, the load line 508 may be fluidly coupled to identify the fluid pressure being applied to line B.

The orbital valve 506 may also become oriented in a third position. In one non-limiting example, the orbital valve 506 may become oriented in the third position when the steering wheel is rotated in a counter-clockwise direction. In the third position, the pump line 502 may be fluidly coupled with line A to thereby provide pressurized hydraulic fluid to the cylinders 402, 404 via line A. In addition, while the orbital valve is in the third position, the tank line 504 may be fluidly coupled to line B thereby allowing hydraulic fluid in line B of the cylinders 402, 404 to exhaust to the tank 312. Accordingly, when the orbital valve 506 is in the third position, the cylinders 402, 404 may be in the first configuration described above wherein the first cylinder 402 may become elongated as the second cylinder 404 is shortened. Also, while in the third position, the load line 508 may be fluidly coupled to identify the fluid pressure being applied to line A.

Figure 6:
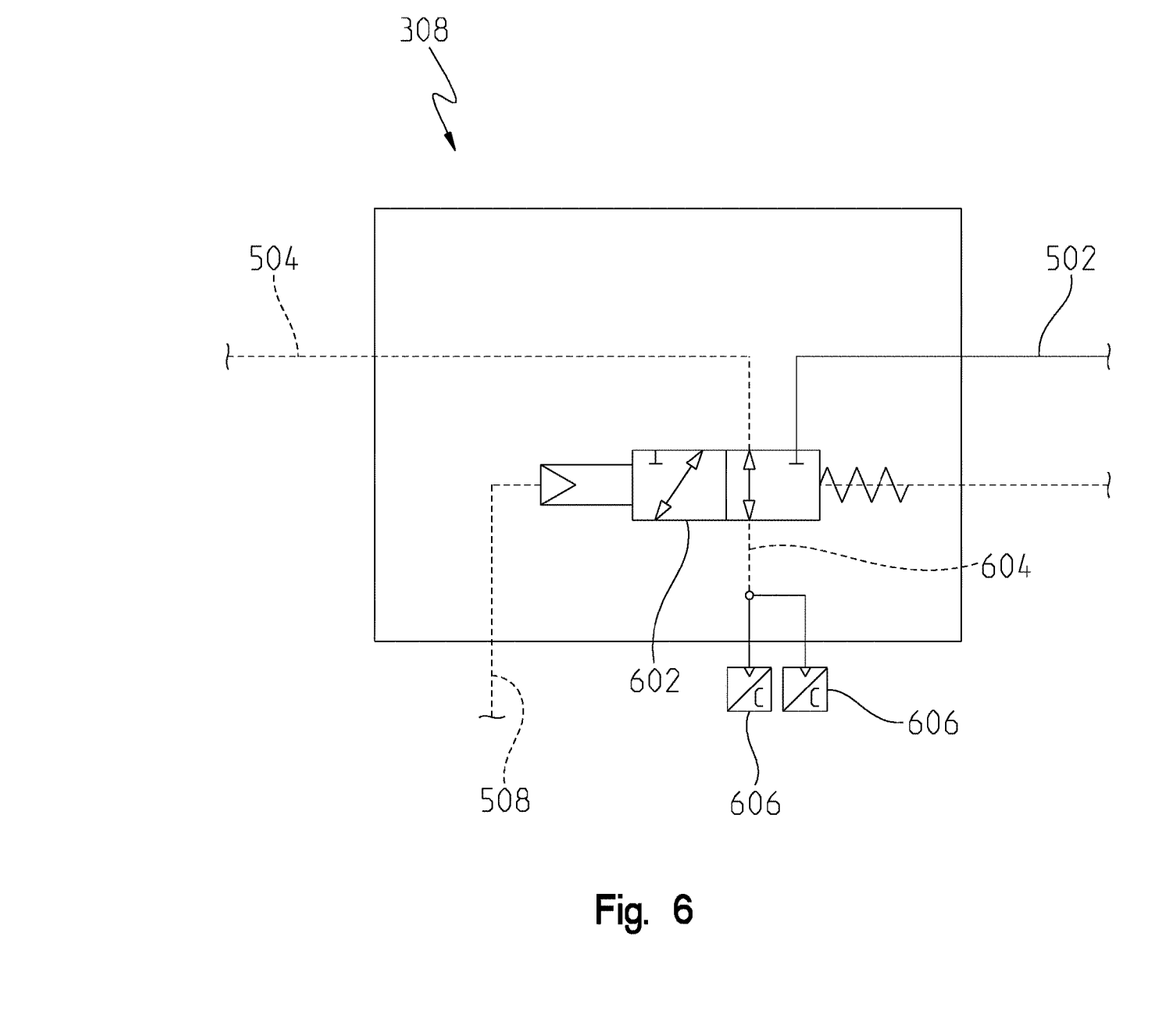
FIG. 6 is a partial schematic view of a steering logic valve assembly from FIG. 3.

Referring now to FIG. 6, the steering logic valve assembly 308 is more particularly shown. The steering logic valve assembly 308 may have a two position logic valve 602. The logic valve 602 may selectively fluidly couple either the pump line 502 or the tank line 504 to a sensor line 604. Further, the sensor line 604 may be coupled to one or more orbital sensor 606 that can communicate with a controller to identify a fluid pressure in the sensor line 604.

The logic valve 602 may be repositionable between a first position (as shown in FIG. 6) and a second position based on the pressure in the load line 508. More specifically, if the pressure in the load line 508 is less than a load line threshold, as it is when the orbital valve 506 is in the first position, the logic valve 602 may also be in a first position. In the first position, the logic valve 602 fluidly couples the tank line 504 to the sensor line 604 and the orbital sensors 606 identify a low pressure value. However, if the pressure in the load line 508 is greater than a load line threshold, as it is when the orbital valve 506 is in the second or third position, the logic valve 602 may be in a second position. In the second position, the logic valve 602 fluidly couples the pump line 502 to the sensor line 604 and the orbital sensors 606 identify a high pressure value generated by the pump assembly 310.

Figure 7:
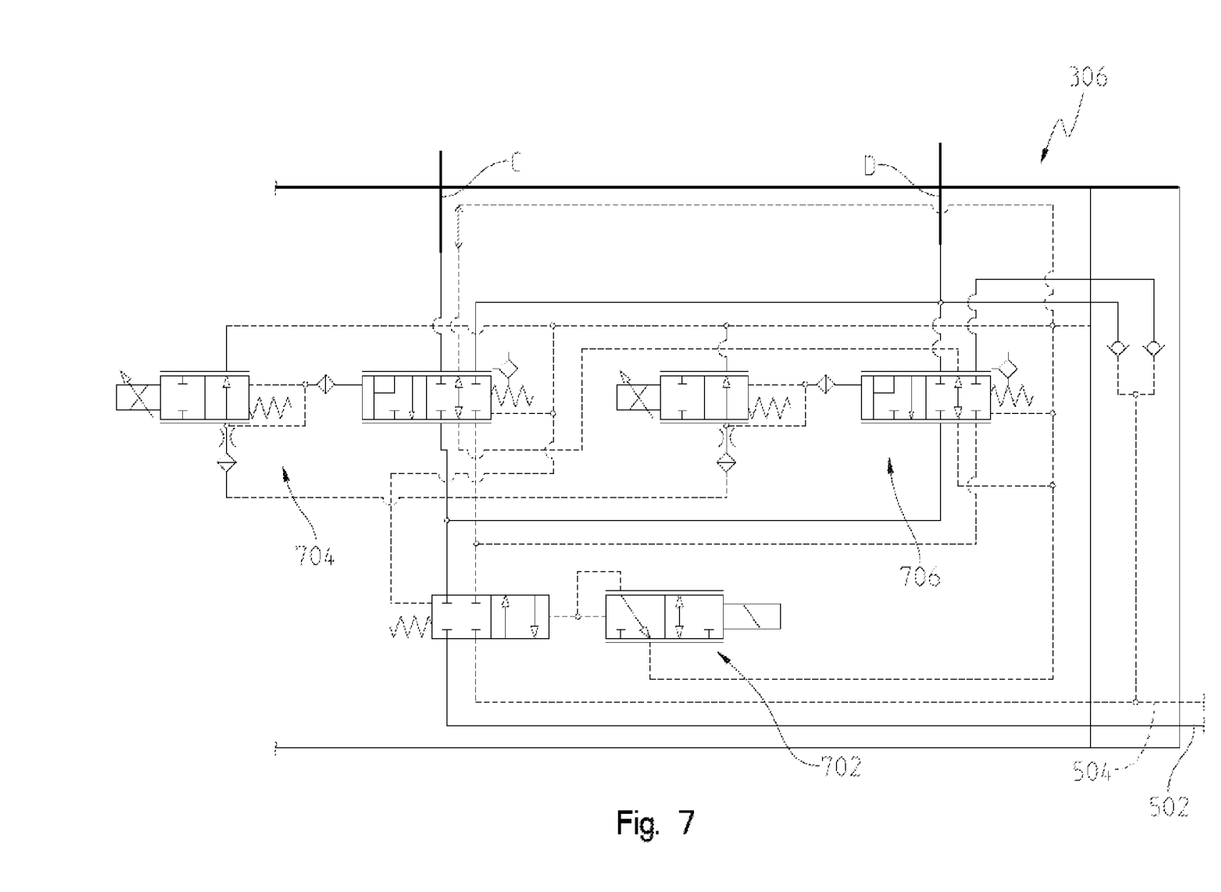
FIG. 7 is a partial schematic view of an electro-hydraulic assembly from FIG. 3.

Referring now to FIG. 7, one non-limiting example of the EH assembly 306 is illustrated. The EH assembly 306 may be configured to convert electrical signals received from sensors on the joystick 208 or other steering device to hydraulic inputs to the cylinder assembly 302. More specifically, the EH assembly 306 may be fluidly coupled to the pump line 502 and the tank line 504 and selectively couple lines C and D to the pump and tank lines 502, 504. In the example shown in FIG. 7, an EH on/off solenoid valve 702 may selectively fluidly couple the EH system 306 to the pump and tank line 502, 504. The EH on/off solenoid valve 702 may communicate with a controller to identify when the EH assembly 306 should be engaged to control the cylinder assembly 302. When the EH on/off solenoid valve 702 is in the off position, the EH assembly 306 will not provide substantial hydraulic inputs to the cylinder assembly 302. Alternatively, when the EH on/off solenoid valve 702 is in the on position, the EH assembly 306 will provide hydraulic inputs to the cylinder assembly 302 responsive to commands from the joystick 208 or other steering device.

When the EH on/off solenoid valve 702 is in the on position, a left steer valve assembly 704 and a right steer valve assembly 706 may selectively couple the pump line 502 and the tank line 504 to the corresponding lines C and D of the cylinder assembly 302. More specifically, the left steer valve assembly 704 may be a solenoid valve assembly that orients the cylinder assembly 302 in a left turn configuration when the joystick 208 identifies a left steer input. Similarly, the right steer valve assembly 706 may be a solenoid valve assembly that orients the cylinder assembly 302 in a right turn configuration when the joystick 208 identifies a right steer input.

The right and left steer valve assemblies 704, 706 may alter the cylinder assembly 302 between the first and second configurations for lines C and D described above utilizing solenoid control valves that respond to the joystick 208 inputs. In other words, a controller my interpret signals received from a joystick and position the right and left steer valve assemblies 704, 706 to fluidly coupled lines C and D to the pump line 502 and tank line 504 to manipulate the cylinder assembly 302 as desired by the user to steer the work machine 100.

Figure 8:
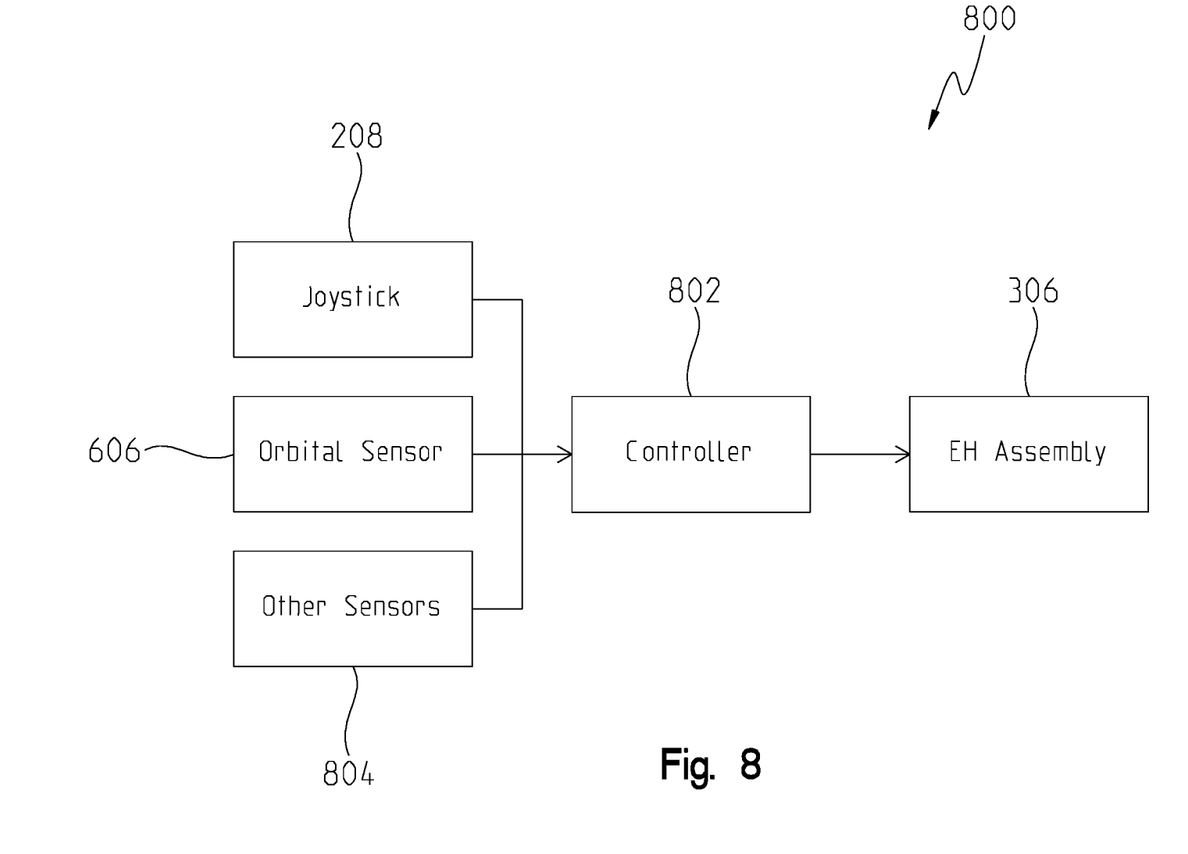
FIG. 8 is a schematic representation of a control system.

Referring now to FIG. 8, one exemplary diagram of a control system 800 is illustrated. The control system 800 may have a controller 802 that communicates with the joystick 208, the orbital sensor 606, and any other sensors 804 that may assist in controlling the EH assembly 306. More specifically, the joystick 208 may send signals to the controller 802 indicating the user's desire to alter the orientation of the cylinder assembly 302. In one non-limiting example, the joystick 208 may send a signal to the controller 802 indicating a right turn condition. The controller 802 may receive the signal and determine whether the EH assembly 306 should be provided instructions to manipulate the solenoid valve 704, 706 accordingly.

Similarly, the orbital sensors 606 may communicate with the controller 802 to identify when the orbital valve assembly 304 is providing a hydraulic input to the cylinder assembly 302. In this non-exclusive example, a fluid pressure identified by the orbital sensors 606 may be compared to a pressure threshold stored in the controller 802 to determine whether an orbital command is being applied. If the controller 802 determines that an orbital command is being applied, the controller 802 may not engage the EH assembly 306 even when the controller identifies an EH command form the joystick 208. In one non-exclusive example, the fluid pressure identified by the orbital sensors 606 may be the hydraulic pressure provided by the pump assembly 310.

In one aspect of this disclosure, the controller 802 may communicate with two separate orbital sensors 606 fluidly coupled to the sensor line 604. The controller 802 may identify the pressure value from each of the orbital sensors 606 and not engage the EH assembly 306 if either of the orbital sensors 606 indicate to the controller 802 that an orbital command is being applied. However, this disclosure also considers utilizing fewer than two orbital sensors 606 to implement the teachings herein. Further, other embodiments may have more than two orbital sensors 606.

The controller 802 may also be in communication with other sensors 804. Other sensor 804 may include, but is not limited to, a position sensor for the armrest 206 or an EH steering system switch. In one non-limiting example, the controller 802 may only engage the EH assembly 306 when the controller 802 communicates with the other sensors 804 to ensure the proper conditions exist for engaging the EH assembly 306. More specifically, the controller 802 may utilize the other sensors 804 to identify the position of the armrest 206 and only engage the EH assembly 306 when the armrest 206 is in a down position. Further, the other sensors 804 may include a vehicle speed sensor and the controller 802 may not engage the EH assembly 306 unless the vehicle speed is under a speed threshold. Further still, the EH steering system switch may be monitored by the controller 802 to determine when the user positions the EH steering system switch in an active position. In this example, the controller 802 may activate the EH assembly 306 when the controller identifies an input from the joystick 208. Alternatively, if the EH steering system switch is in an inactive position, the controller 802 may not activate the EH assembly 306 when the controller 802 identifies an input from the joystick 208.

Several sensors are described herein and a person skilled in the art understands that these sensors could take many different forms. More specifically, the joystick 208 may utilize any type of position, strain, or the like sensor known in the art for identifying a joystick position. Similarly, the orbital sensors 606 may be any type of pressure sensor capable of determining a fluid pressure, flow, or other fluid condition of a fluid passage. Accordingly, this disclosure broadly refers to sensors as being any type of sensor known by a person having skill in the relevant art that can achieve the desired or similar reading.

Figure 9:
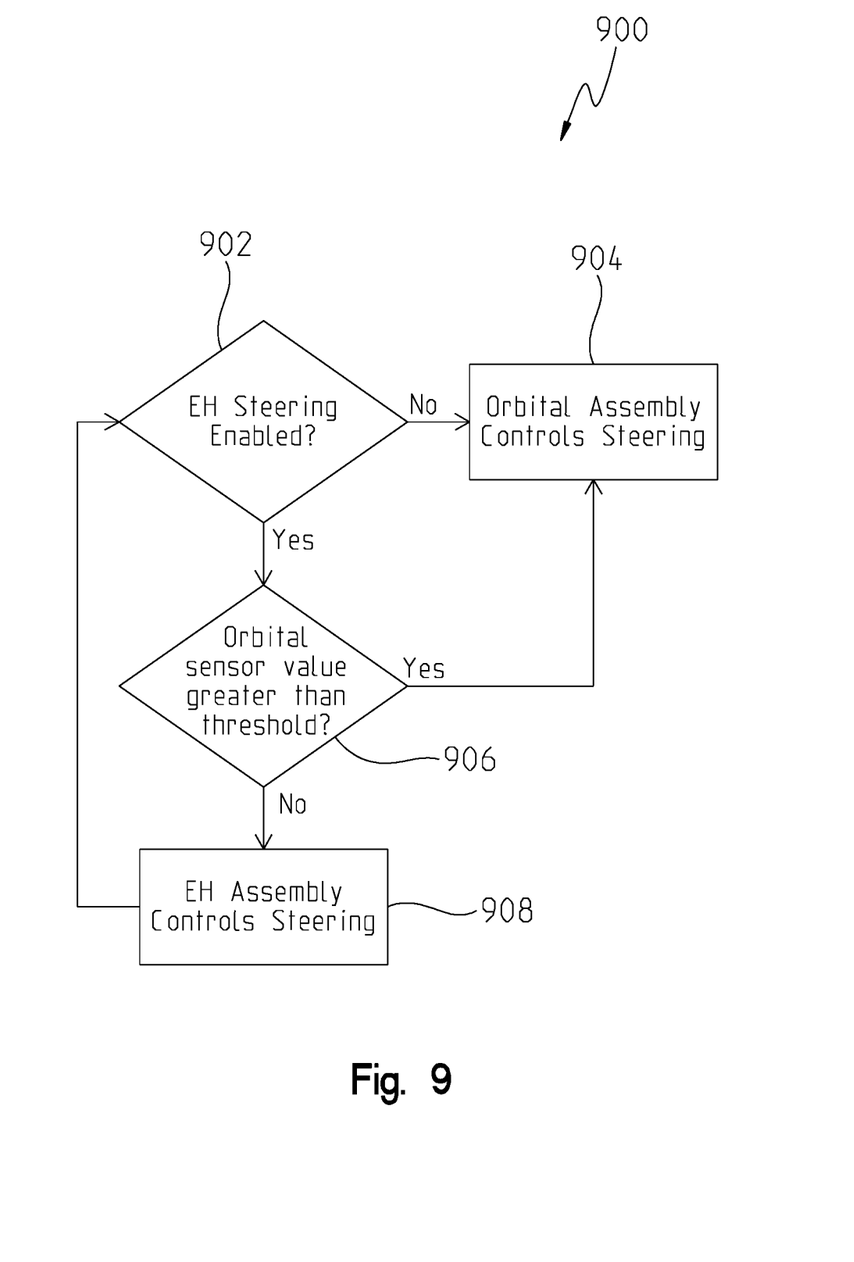
FIG. 9 is a logic flowchart for the control system of FIG. 8.

Referring now to FIG. 9, one non-exclusive example of a logic flowchart 900 is illustrated. The logic flowchart 900 may be stored in and implemented by the controller 802 or any other control system of the work machine 100. Further, the logic flowchart 900 may be executed by more than one controller. More specifically, certain portions of the logic flowchart 900 may be executed by one controller while other portions of the logic flowchart 900 may be executed by a different controller. Accordingly, while the flowchart 900 is described herein as being executed by the controller 802, any type of control system or combination of controllers may be used to execute the flowchart 900 as is known by a person having relevant skill in the art.

In the flowchart 900, the controller 802 may first determine whether the EH steering is enabled in box 902. In box 902, the controller 802 may communicate with the other sensors 804 to determine whether the work machine 100 is in a condition that allows the EH assembly 306 to control the cylinder assembly 302. More specifically, the controller 802 may communicate with the position sensor of the armrest 206 to determine whether the armrest is in the down position. Further, the controller 802 may communicate with the EH steering system switch to identify whether the user has enabled the EH assembly 306 to control the cylinder assembly 302. Further still, the controller 802 may communicate with a vehicle speed sensor to determine if the vehicle speed is below a vehicle speed threshold. The controller 802 may check any other sensor to identify the condition of the work machine in box 902 and this disclosure is not limited to the particular examples provided.

If any of the other sensors 804 are not within the appropriate threshold values, the controller 802 may not enable the EH steering and execute box 904. In box 904, the controller 802 does not transmit signals from the joystick 208 to the EH assembly 306. In other words, in box 904, the controller 802 determines that either the user does not intend to use the joystick 208 or that the vehicle conditions do not meet the requisite threshold values. In one non-exclusive example, the controller 802 may determine that the user does not intend to use the joystick 208 when the position sensor indicates the armrest 206 is in an up position or when the EH steering system switch is disabled. Further, in another non-exclusive example, the controller 802 may determine that the vehicle conditions do not meet the requisite threshold values if the vehicle has a vehicle speed greater than a vehicle speed threshold. The examples given herein are meant to be exemplary only and are not exclusive. A person having skill in the relevant art understands there may be other situations where the controller 802 will not allow the joystick 208 to control the EH assembly 306 and this disclosure contemplates those as well.

In box 904, even if the controller 802 receives signals from the joystick 208 indicating joystick movement, the controller 802 will not engage the solenoid valves 702, 704, 706 of the EH assembly 306. In other words, the controller 802 isolates the EH assembly 306 from the joystick 208 inputs in box 904.

However, if the controller 802 determines that EH steering is enabled in box 902, the controller 802 may proceed to box 906 where the controller 802 identifies values received from the orbital sensors 606. The controller 802 may determine that the EH steering is enabled in box 902 when the other sensors 804 indicate that is the case. More specifically, the controller 802 may communicate with the position sensor of the armrest 206 to determine that the armrest is in the down position. Further, the controller 802 may communicate with the EH steering system switch to identify that the user has enabled the EH assembly 306 to control the cylinder assembly 302. Further still, the controller 802 may communicate with a vehicle speed sensor to determine that the vehicle speed is below the vehicle speed threshold. Accordingly, when the other sensors 804 indicate the work machine is in a condition to allow the EH assembly 306 to control the cylinder assembly 302, the controller 802 may execute box 906.

In box 906, the controller 802 may compare values received from the orbital sensors 606 to threshold values stored in the controller 802 or other location accessible to the controller 802. The controller 802 may communicate with the orbital sensors 606 to determine whether the fluid pressure in the sensor line 604 is greater than an orbital sensor threshold. The orbital sensor threshold may be set to any value that indicates that the orbital assembly 304 is being manipulated by the user. As described above, the load line 508 of the orbital valve 506 may reposition the logic valve 602 when the orbital valve 506 is applying a fluid pressure to line A or line B. The load line 508 may reposition logic valve 506 to thereby fluidly couple the sensor line 604 to the pump line 502 and provide a pump pressure to the sensor line 604. The pump pressure may be greater than the orbital sensor threshold and thus when the load line 508 provides a pressure great enough to reposition the logic valve (for example when the steering wheel 204 is being rotated), the logic valve 602 fluidly couples the pump line 502 to the sensor line 604 and the orbital sensors 606 identify a fluid pressure greater than the orbital sensor threshold.

In one example of the present embodiment, the pressure required to transition the logic valve 602 from the first position to the second position may be a pressure threshold that indicates the steering wheel 204 is being intentionally manipulated. More specifically, the pressure provided by the load line 508 to reposition the logic valve 602 is a pressure that is indicative of intentional rotation of the steering wheel and not induced by vibrational or other unintentional inputs.

If the controller 802 identifies that the orbital sensors 606 are showing a value greater than the orbital sensor threshold, the controller 802 may execute box 904 and not transmit signals from the joystick 208 to the EH assembly 306. In other words, when the controller 802 identifies that the steering wheel 204 is providing a hydraulic input to the cylinder assembly 302, the orbital assembly 304 may exclusively control the cylinder assembly 302.

However, if the controller 802 does not identify orbital sensor values greater than the orbital sensor threshold than the controller 802 may execute box 908. In box 908, the controller 802 may respond to inputs from the joystick 208 by sending corresponding signals to the right and left steer valve assemblies 704, 706. More specifically, the right and left steer valve assemblies 704, 706 may be solenoid controlled valve assemblies that selectively fluidly couple the line C and line D of the cylinder assembly to the pump line 502 and the tank line 504 as described above. Accordingly, once the controller 802 determines that the EH assembly 306 should control the cylinder assembly 302, the controller 802 sends signals to the valve assemblies 704, 706 to actuate the valves in a way that corresponds with the signals received from the joystick 208. In other words, if the EH assembly 306 is enabled and the orbital sensors 606 are not indicating movement of the steering wheel 204, the joystick 208 may control the steering of the work machine 100.

While boxes 902 and 906 are shown in a sequential order, the logic flowchart 900 may substantially simultaneously check boxes 902 and 906 and only allow EH assembly control of box 908 when both conditions allow EH assembly 306 control. Further, even after the controller 802 has allowed the EH assembly 306 to control steering the controller 802 may still monitor boxes 902 and 906. More specifically, if the EH steering is ever disabled in box 902, the EH assembly control steering of box 908 will no longer be allowed. Similarly, if the orbital sensor pressure value raises above the threshold value, the controller 802 may no longer allow the EH assembly 306 to control the cylinder assembly 302.

In one non-exclusive example, the user may enter the operator cab 114 and sit in the seat 202. If the user does not lower the armrest 206, the controller 802 will only allow the orbital valve assembly 304 to control the cylinder assembly 302 because the armrest position sensor indicates the armrest 206 is in a raised position. However, once the user lowers the armrest 206, the controller 802 may identify that the joystick 208 and the EH assembly 306 may now be utilized to control the cylinder assembly 302. At this point, the controller 802 may monitor the pressure values generated based on the orbital sensors 606 to determine whether the orbital valve assembly 304 is being intentionally manipulated by the user (for example, the steering wheel 204 is being rotated). If the controller 802 ever identifies a pressure value via the orbital sensors 606 that is greater than the orbital threshold, the controller 802 determines that the orbital valve assembly 304 is being used to provide a steering input to the cylinder assembly 302 and thereby no longer sends electronic signals to the EH assembly 306. Alternatively, if the controller 802 determines that the pressure values determined by the orbital sensors 606 are less than the orbital threshold value, than the EH assembly 306 may provide steering inputs to the cylinder assembly 302.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this pertains and which fall within the limits of the appended claims

The invention claimed is:

1. A work machine having a cab, the work machine comprising:
a steering system;
a controller configured to selectively articulate the steering system with an electro-hydraulic assembly;
a joystick assembly positioned in the cab and in communication with the controller to selectively engage the electro-hydraulic assembly to articulate the steering system;
a steering wheel assembly positioned in the cab and configured to selectively articulate the steering system with an orbital valve assembly; and
a steering wheel sensor coupled to the steering wheel assembly and in communication with the controller to identify movement of the steering wheel assembly by monitoring a fluid pressure of the orbital valve assembly;
wherein, the controller prevents the electro-hydraulic system from articulating the steering system responsive to movement of the joystick assembly when the steering wheel sensor identifies movement of the steering wheel by identifying fluid pressure provided by the orbital valve assembly.

2. The work machine of claim 1, further wherein the steering wheel sensor is a hydraulic pressure sensor positioned to identify when the orbital valve assembly is producing a fluid pressure above a threshold.

3. The work machine of claim 1, further wherein the orbital valve assembly is fluidly coupled to a steering logic valve assembly that selectively fluidly couples the steering wheel sensor to a pump line when the steering wheel assembly is providing an input to the orbital valve assembly.

4. The work machine of claim 1, further comprising:
an armrest positioned in the cab and having a first position and a second position; and
an armrest position switch coupled to the armrest and communicating to the controller whether the armrest is in the first position or the second position;
wherein, the joystick assembly controls the steering system through the electro-hydraulic assembly when the controller determines that the armrest is in the second position, and the steering wheel sensor is not identifying movement of the steering wheel assembly by monitoring the fluid pressure of the orbital valve assembly.

5. The work machine of claim 4, further wherein the orbital valve assembly has at least one input and at least one output;
further wherein, the steering wheel sensor is a hydraulic pressure sensor positioned to identify when the output of the orbital valve assembly is above an output threshold;
further wherein, the controller communicates with the steering wheel sensor and identifies movement of the steering wheel assembly when the hydraulic pressure sensor indicates a hydraulic pressure above a hydraulic pressure threshold.

6. The work machine of claim 1, further wherein the orbital valve has an active position and an inactive position, wherein the active position selectively fluidly couples the steering system to a tank and a pump.

7. The work machine of claim 6, further comprising:
a logic valve fluidly coupled to the orbital valve; and
the steering wheel sensor comprises a pressure sensor fluidly coupled to the logic valve through a sensor line;
wherein the logic valve selectively couples the sensor line to the pump when the orbital valve is in the active position.

* * * * *